May 2, 1933.  S. P. MERMER  1,906,329
PLATE GLASS GRINDING APPARATUS
Filed May 13, 1929   2 Sheets-Sheet 2
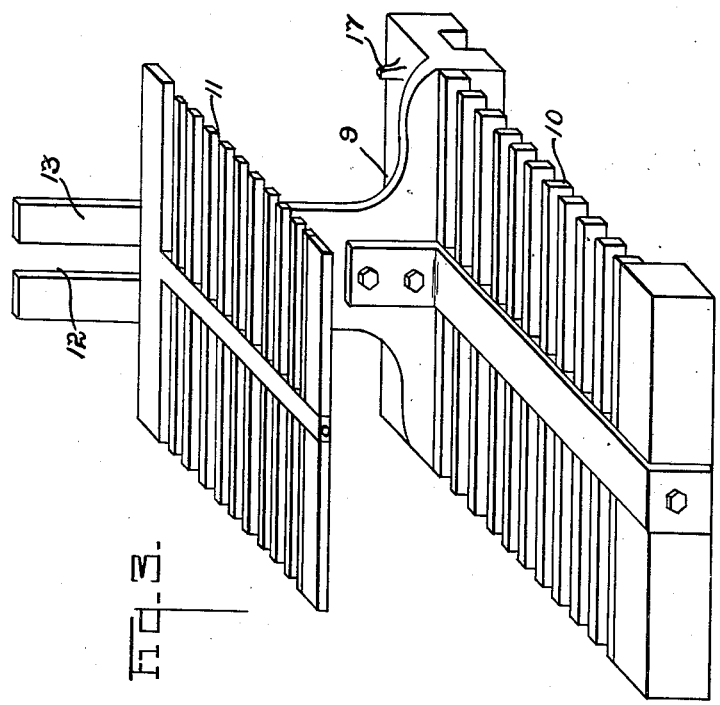
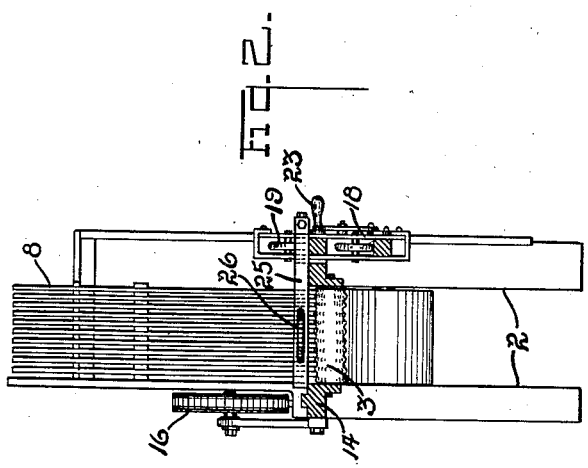
Inventor
Stephen P. Mermer
By Owen & Owen
Attorneys Patented May 2, 1933

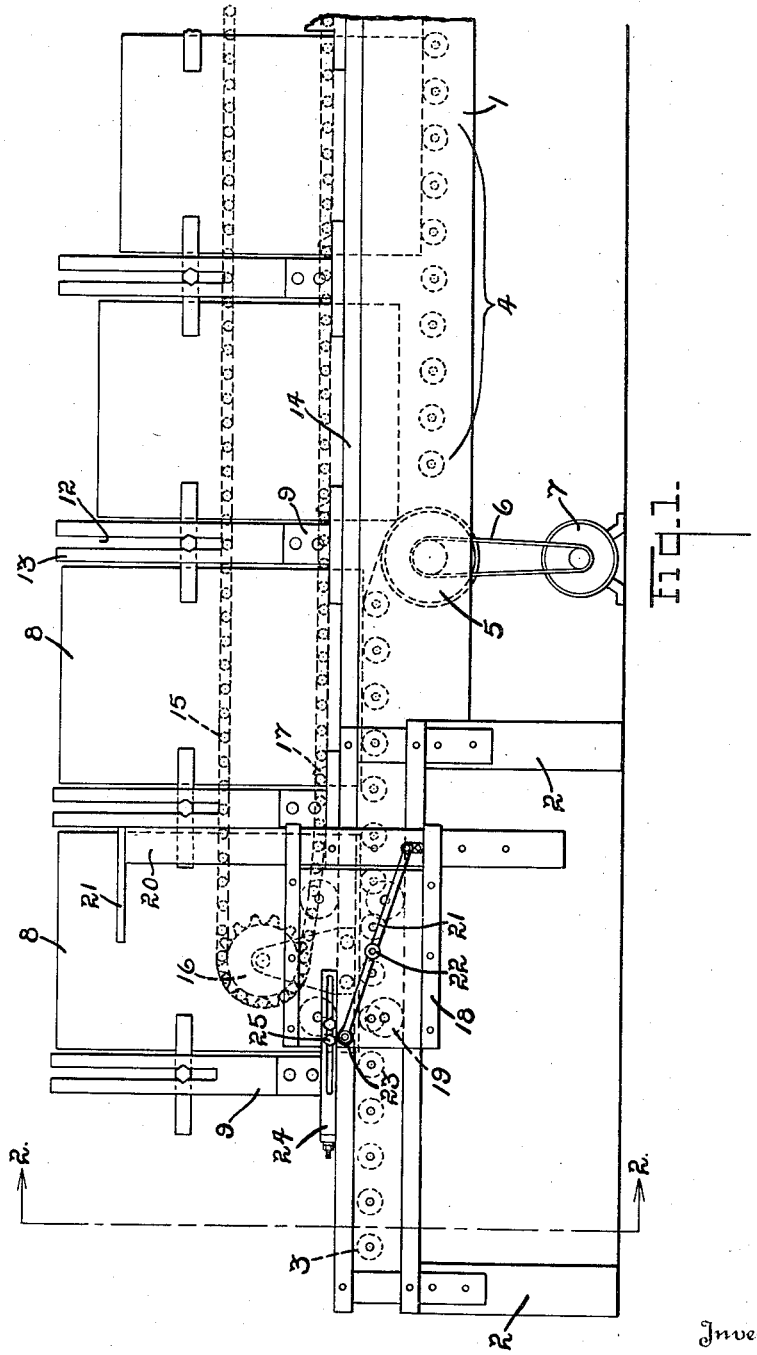

1,906,329

UNITED STATES PATENT OFFICE

STEPHAN P. MERMER, OF TOLEDO, OHIO, ASSIGNOR TO THE COMMERCIAL SAVINGS BANK & TRUST COMPANY, OF TOLEDO, OHIO, A CORPORATION OF OHIO, AS TRUSTEE

PLATE GLASS GRINDING APPARATUS

Application filed May 13, 1929. Serial No. 362,584.

This invention relates to a grinding apparatus for grinding glass plates such as are used in windows and windshields of automobiles, but more particularly to grinding the corners of glass plates.

An object of the invention is to provide a simple and efficient apparatus for grinding the corners of glass plates by which the corners are ground during the travel of the plates so that a large number of plates may be ground in a comparatively short period of time, and at a minimum of expense.

Further objects of the invention will hereinafter appear, and the invention is shown by way of illustration in the accompanying drawings, in which:

Fig. 1 is a side elevation of an apparatus for grinding the corners of glass plates;

Fig. 2 is a vertical sectional elevation on the line 2—2 of Fig. 1;

Fig. 3 is a perspective view of one of the racks.

The illustrated embodiment of the invention comprises a support 1 mounted on suitable legs 2 and provided with a series of supporting rollers 3. The rollers 3 are preferably of hard rubber and grooved to receive the lower edge of a glass plate. The number and size of the rollers 3 may be varied as desired. An advanced portion of the rollers 3 indicated generally at 4, is disposed below the forward group of rollers, and is spaced horizontally therefrom. In the space between the groups of rollers is a grinding wheel 5, which may be connected by a belt 6 to an electric motor 7.

The glass plates 8 are supported in upright position by racks 9 having lower fingers 10 and upper fingers 11. The upper fingers 11 are adjustable vertically in a slot 12 formed in an upright support 13. The fingers 11 are arranged in two groups, one extending rearwardly and the other extending forwardly, and the same arrangement exists with the group 10. This enables one rack to engage the forward edge portions of one set of plates and the rear edge portions of another set of plates, as shown on the drawings. The racks 9 are movable horizontally along tracks 14, and guidingly maintain the plates in upright position with their lower edges in engagement with the rollers 3.

In order to advance the racks 9 along the tracks 14 to effect horizontal travel of the plates 8 an endless chain 15 is trained over a sprocket 16, one end of the apparatus, and a similar sprocket at the opposite end (not shown). The sprocket may be driven in any suitable manner. Formed on each rack 9 is a lug 17 engageable with a link in the chain 15. It will be understood that the chain 15 is driven slowly and continuously so that the glass plates 8 are slowly moved over the groups of rollers 3.

In operation, it will be understood that during the travel of the plates 8 horizontally over the rollers 3, that after leaving the first group of rollers the plates are allowed to drop downwardly, and in doing so the lower rear corner of the glass plates engages the rotating grinding wheel 5, and in this manner such corners are ground. From the grinding wheel 5 the plates come into engagement with the roller group 4, and continue their advancing movement. It is apparent that there is no interruption to the travel of the glass plates during the grinding of the corners, and no handling of the plates is necessary for this purpose. The corners are automatically ground as the plates are advanced, each successive set of plates passing from the upper line of roller support to the lower line of support, and during such movement ride over the grinding wheel 5 which secures the correct grinding of the corners, as will be apparent to those skilled in the art.

In order to facilitate handling of the glass plates 8, in delivering the same to the advancing mechanism a carrier 18 having rollers 19 engageable with portions of the support 1 is movable horizontally along the support. Provided on the forward portion of the carrier 18 is an upwardly extending supporting member 20 having a series of rearwardly extending fingers 21'. The member 20 is vertically slidable in the carriage 18, and may be manually shifted vertically by a lever 21 pivoted at 22 and having a handle 23. A plate 24 has an adjustable slot and pin connection 25' with the carriage 18 for horizontal adjustment, and pivoted to at one end the outer end of the plate 24 is pusher bar 25 provided with a handle 26. The other end of the bar 25 is free whereby same may be swung away from the plate 24 to enable the glass plates to be placed in the racks 9.

The carriage 18 is for delivering glass plates to the advancing mechanism, and is made use of as follows. The carriage is moved rearwardly or to the left of Fig. 1, and the plates to be ground are placed in upright position between the rearwardly extending fingers 21′ of the member 20. Thereafter, a rack 9 is moved into position to support the rear edge portions of the plate for maintaining them in the proper position. The pusher bar 25 has previously been swung to upright position to permit the rack to be moved into engagement with the plates. After the rack 9 is properly positioned the bar 25 is swung downwardly, and by grasping the handle 26 the entire assembly may be moved as a unit horizontally into engagement with the next preceding rack, so that the rearward extending fingers of this rack engage the forward edge portions of the plates. The fingers 21′ of the supporting member 20 may be moved out of the way by pushing downwardly on the handle 23, thereby elevating the fingers above the plates 8. The carriage 18 may now be moved rearwardly or to the left of Fig. 1 into position to receive the next set of plates.

The above described construction may be employed as an additional unit for the apparatus shown and described in my Patent 1,687,985, and the plates may be turned to present other corners for grinding after the manner shown and described in my previous patent. By such arrangement it is apparent that the several edges of the plates may be ground or beveled successively, and by the apparatus and method above described, the corners may be automatically ground, thereby providing a complete automatic machine for grinding glass plates without the troublesome and expensive handling thereof, which has heretofore been necessary.

From the foregoing it will be seen that the corner of the plate is rounded without any tilting thereof about an axis transverse to the plane of plate, and that the rounding is effected by simultaneously imparting linear movements to the plate in directions at an angle to each other and at a plane of the plate, the corner of the plate being in contact with the periphery of the grinding wheel and being guided thereby so that the corner of the plate in grinding moves in a path substantially corresponding to the arc of the grinding wheel.

It is therefore apparent that in performing my method of rounding a plate corner, one side edge of the plate is first brought into contact with the grinding surface adjacent to the corner to be rounded and the plate then has linear movements in two directions at an angle to each other and in the plane of the plate so that the grinding action is finished at the opposite side edge of the corner from that from which it was begun.

It is to be understood that numerous changes in details of construction, arrangement and operation may be effected without departing from the spirit of the invention, especially as defined in the appended claims.

What I claim is:

1. Apparatus for grinding glass plates comprising a horizontally disposed support for the bottom edge of a glass plate, an advanced portion of the support being spaced vertically below the first portion, said supporting means being forwarded to advance the plate over the support, means to hold the plate in upright position during advancing movement, and means for grinding a corner of the plate when the latter moves from the forward portion of the support to the lower advanced portion.

2. Apparatus for grinding corners of glass plates comprising an interrupted line of support, one portion of which is below the other, means for advancing a glass plate along said support to cause the plate to drop from the upper to the lower portion of the support, and grinding means in the path of vertical movement of the plate, thereby to grind a corner of the plate as the latter passes over the grinding means.

3. An apparatus for grinding the corners of glass plates comprising a support for the bottom edge of a glass plate, said support having a portion spaced horizontally from and vertically below an adjacent portion, grinding means in the space between said upper and lower supporting portions, means for engaging front and rear edges of the plates, and means for advancing the plate along said support whereby the plate drops from the upper to the lower supporting portion during its travel and the lower rear corner engages and passes over said grinding means.

4. An apparatus for grinding plates, comprising plate supporting means, means to hold the plate in upright position and to enable same to respond to the action of gravity, means to advance the plate holding means along the support, said supporting means being formed to permit the plate at a predetermined position to be moved downwardly by the action of gravity while advancing, and means to grind a corner edge of the plate during such downward movement thereof.

5. An apparatus for grinding plates comprising a horizontally disposed support for the bottom edge of a plate, an advanced portion of the support being spaced below the forward portion, means to advance the plate over the support, means to hold the plate in upright position during advancing movement and to permit same to be moved downwardly by the action of gravity, and means for grinding a corner of the plate when the latter moves downward from the forward portion of the support to the lower advanced portion.

6. In combination with a plate mover, means for effecting movement of the mover, means to cause the mover to travel in one path and constructed and arranged to cause bodily shifting movement of the plate into a second path offset relative to the first path and during continued movement of the mover, and means for grinding an end corner edge of the plate during such shifting movement thereof.

7. In combination with a plate mover, and means to actuate same, means to effect initial travel of the mover in one plane and constructed and arranged to cause the plate to gravitate during travel of the mover into a plane lower than said initial plane, and means to grind an end corner edge of the plate during such gravitative movement thereof.

8. In combination with a mover for holding a plurality of plates on edge in a substantially vertical position, means to advance the mover, and means to define the path of movement of the mover to cause a bounding edge of each plate to be moved in one straight path and then at an angle to said path into a second path, and grinding means for bevelling a corresponding corner edge of each plate while moving in said angular path.

9. In combination with grinding means, plate supporting means to engage a side edge of the plate thereby to vertically support same, means to effect travel of the plate in one path on said supporting means toward the grinding means, said supporting means having a part located below the first named path and extending away from the grinding means whereby upon gravitation of the plate from the first path to the lower path same will move across the grinding means while continuing travel thereof to bevel an end corner edge thereof.

10. In a plate grinding machine, means to support a plate in one path, means to hold the plate in a predetermined position, second means to support the plate in a second path spaced from and substantially parallel to the first path, means located in the space between the two supporting means to grind an end edge corner of the plate during bodily shifting movement thereof from the first to the second supporting means, and means to effect travel of said holding means from one supporting means to the other.

11. In combination with grinding means, spaced plate guiding means offset in the plane of the plate and disposed on opposite sides of the grinding means and means to effect travel of the plate relative to the guiding means so as to move the plate from one guiding means to the other and at the same time against the grinding means, whereby the plate is guided solely by the grinding means while moving from one guiding means to the other and has its edge ground.

12. In combination with a grinding wheel, plate guiding means extending toward the wheel, other plate guiding means extending away from the wheel, said guiding means being relatively laterally spaced and means to effect travel of the plate along the first and subsequently along the second guiding means thereby to cause a rear corner edge only of the plate to contact with the periphery of the wheel and be guided solely thereby and simultaneously ground during shifting of the plate from one guiding means to the other.

13. The hereindescribed method of bevelling plates which resides in moving the plate in a path toward the front of a grinding wheel, and then during such movement of the plate moving the plate transversely of the axis of the grinding wheel whereby to cause the plate to move in a path substantially corresponding to the arc of the grinding wheel, and in grinding the rear edge of the plate by the rear of the grinding wheel during said arcuate movement of the plate.

14. The hereindescribed method of bevelling plates, which resides in moving the bottom edge of a plate toward a grinding wheel and in simultaneously moving the plate transversely of the axis of the grinding wheel and away therefrom whereby to cause the plate to move in a path substantially corresponding to the arc of the grinding wheel, and in grinding the corner of the plate at said bottom edge and the adjacent vertical edge thereof during said arcuate movement of the plate.

15. The method of rounding the corners of plates which resides in simultaneously imparting linear movements to the plate in directions at an angle to each other and in the plane of the plate and with the corner of the plate to be ground in contact with the periphery of a grinding wheel whereby the corner of the plate is rounded without tilting of the plate about an axis transverse to the plane of the plate.

16. The method of grinding a plate by a rotary grinding wheel comprising maintaining a plate in upright position, and concomitantly imparting substantially translatory movement to the plate with an edge in engagement with the wheel through a curvilinear path defined by the periphery of the grinding wheel.

In testimony whereof I have hereunto signed my name to this specification.

STEPHAN P. MERMER.